July 17, 1951 F. WHITTLE 2,561,303
REDUCTION OF DRAG OF, AND PROPULSION OF, AERODYNAMIC
OR HYDRODYNAMIC BODIES
Filed Feb. 19, 1948 2 Sheets-Sheet 1
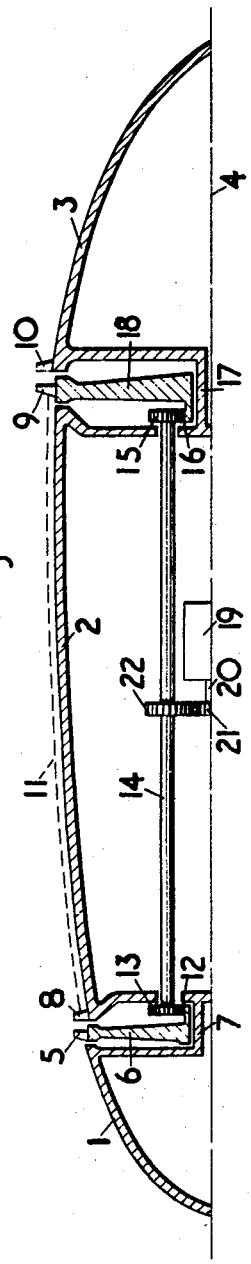
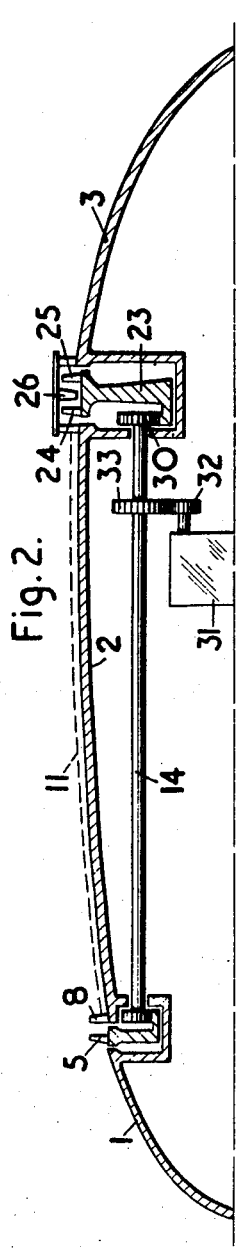
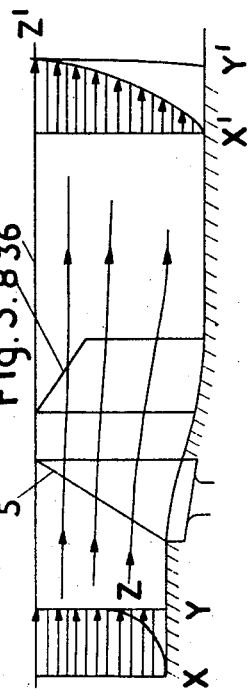
Inventor.
Frank Whittle
By
Stevens Davis + Miller
his Attorneys

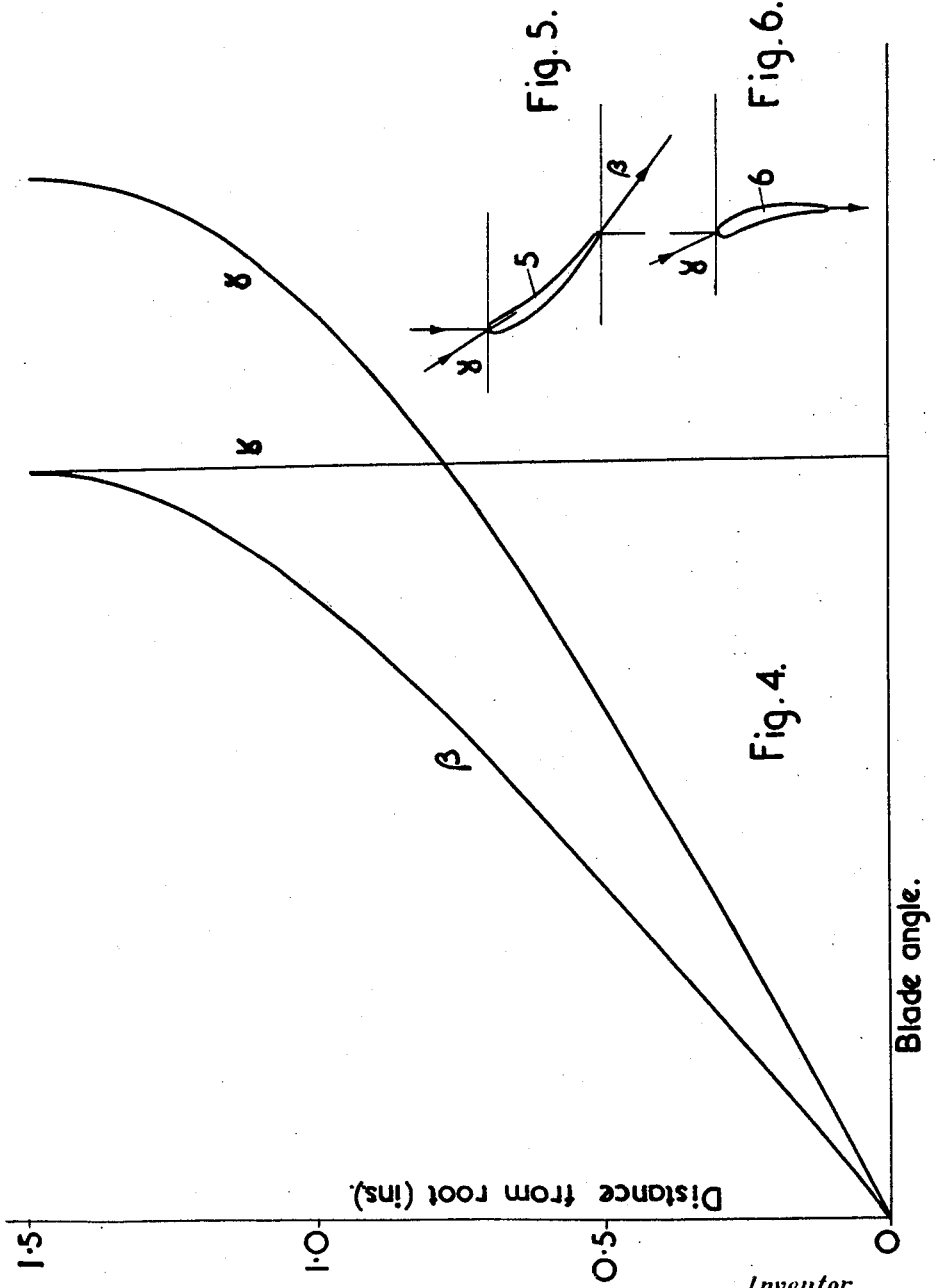

Patented July 17, 1951

2,561,303

UNITED STATES PATENT OFFICE 2,561,303

REDUCTION OF DRAG OF AND PROPULSION OF AERODYNAMIC OR HYDRODYNAMIC BODIES

Frank Whittle, Rugby, England, assignor to Power Jets (Research and Development) Limited, London, England, a British company Application February 19, 1948, Serial No. 9,595
In Great Britain June 23, 1943

12 Claims. (Cl. 114—67)

This invention relates to improvements in hull structures and the reduction of drag between bodies or surfaces and relatively moving fluids, and in some cases to the generation of propulsive thrust in addition to drag reduction.

The drag (other than induced drag of lifting surfaces) of a body or surface is dependent upon various factors prominent among which is the value, at and very near the surface of the body, of the rate of change of velocity with distance measured normal to the surface of a boundary layer formed over the said surface. The conception of a boundary layer implies that fluid in contact with the surface of the "wetted" body is at rest relative to the body whilst at some small distance therefrom the relative velocity is of the order of that of the body. In normal conditions of laminar flow, the distance between the surface and the free fluid i. e. that which has full relative velocity, is very small. It follows, therefore, that the velocity gradient outwards in the boundary layer is large and is greater, the higher the relative speed between the body and the fluid. On the other hand for a constant speed, the greater the thickness of the boundary layer, the smaller is the velocity gradient and correspondingly, the less will be the drag.

The underlying idea of this invention is to obtain an artificial thickening of the boundary layer whereby the velocity gradient in it is favourably modified to provide a fully developed laminar boundary layer. The invention accordingly provides means for reducing drag between a body and a fluid surrounding said body and moving relatively thereto comprising energy exchange means for de-energising the boundary layer at an upstream region of said body, and further energy exchange means for re-energising the boundary layer at a downstream region, whereby the boundary layer is substantially thickened between said regions.

The re-energising and de-energising means may be associated with one another so that the energy, or a part thereof, abstracted from the boundary layer can be applied to re-energising the boundary layer at the downstream region.

It is important that the thickening of the boundary layer shall be so arranged that the limiting streamline outside the layer is not displaced from the path which it would follow were potential non-viscous flow to exist. The simple profile of the body is therefore recessed inwardly so that the thickened boundary layer can be accommodated within this streamline.

The re-energising means may also be used as propelling means for the body, and preferably the velocity gradient normal to the body surface should be as nearly as possible that corresponding to parabolic distribution.

The invention basically, clearly applies in a somewhat general way to bodies or surfaces, but practical considerations confine its immediate applications—for reasons only of mechanical limitations—to bodies which are in effect solids of revolution such as submarine hulls, torpedoes, fuselages of aircraft, the interior surfaces of circular sectioned wind tunnels, conduits for liquids, and so forth where the body or surface is totally immersed and lends itself to the installation of periphery sweeping rotating blading.

The effect of the upstream de-energising means is arranged to vary with distance from the surface of the body, so as to extend the thickness of the boundary layer from the usual very small thickness up to a comparatively very great thickness associated with a fully developed boundary layer whilst leaving undisturbed the streamline at the outer margin of this layer.

Conveniently the de-energising and re-energising effects are obtained by energy exchanging means comprising a rotating blade system with its axis of rotation substantially coincident with the longitudinal axis of symmetry of the body which is substantially of uniformly circular section, and the de-energising means may comprise a rotating blade system mounted on a rotor which by any means of energy transmission imparts energy to the re-energising (or re-energising and propelling) means.

Means may also be provided to change the effect of the device for such purposes as control; thus if the energy exchanging means be arrested the drag will be much increased, so that means for stopping the energy exchange can be used as braking means and this of course may be arranged to operate asymmetrically to afford directional controlling forces.

By way of example, two forms of the invention as at present envisaged are hereinunder described with reference to the accompanying drawings in which:

Fig. 1 is a half longitudinal section of one form,

Fig. 2 is a similar view of a second form,

Fig. 3 diagrammatically illustrates the effect of the de-energising means,

Figs. 4-6 show a convenient design of de-energising means. Fig. 1 illustrates the invention as applied to a submarine body intended to operate wholly immersed in water. The hull or body, I, 2, 3 is a solid of rotation about the fore and aft axis 4 which lies in the direction of motion, indicated by the arrow. A short distance aft of the nose 1 which is of streamlined profile, is provided a peripheral row of turbine blades 5 which extend radially and are carried by a wheel 6 mounted on a shaft 7.

These blades 5 are so formed that they are driven by the relative flow of water when the hull is moving forward and abstract energy from the boundary layer, in so doing modifying the leaving velocity so that in the design conditions of operation a rising velocity gradient exists outwards from the surface of the hull, and such that the relative velocity between the hull and the water in direct contact with the surface of the hull is zero while the relative velocity between the hull and the water at the tips of the blades 5 is approximately the same as the forward velocity of the hull. The ideal form of blade is one having the appropriate pitch and profiles, whilst tapering in chord from a maximum at the root to virtually a point at the tip.

Behind this row of blades 5 is a complementary row of stator blades 8, the object of which is to prevent the leaving fluid from having rotational velocity, and downstream of these blades the diameter of the portion 2 of the hull slightly increases along its length to ensure that a slight negative pressure gradient is maintained. At the rear end of the portion 2 there is a somewhat similar arrangement of rotor blades 9 on rotor 18 and stator blades 10, but in this case the arrangement is such as to re-energize the boundary layer.

The energy abstracted by blades 5 is used to assist in driving the blades 9, the shaft 7 being geared through gears 12, 13 with shaft 14 which in turn is geared through gears 15, 16, with the shaft 17 of rotor 18. A motor 19 drives a shaft 20 and gear 21 which engages gear 22 on shaft 14 to compensate for power losses in the transmission from rotor 6 to rotor 18. Behind the stator blades 10 the tail 3 of the hull decreases in diameter. The general shape of the hull is preferably selected according to the following considerations:

If the pressure drops too rapidly in the direction of flow then the boundary layer will thin down because of the acceleration of the fluid in it. On the other hand, if the pressure begins to rise in the direction of flow, the fluid near the surface will not have sufficient energy to sustain the adverse pressure gradient without breakaway. The shape to be aimed at is one which gives a generally descending pressure gradient to as near the tail 3 as possible without too bluff an end to the body. The re-energising blades 9 should be placed at a position immediately in front of that where the pressure begins to rise in the direction of flow.

The effect of the blades 5 (as shown in Fig. 3) is to increase the thickness of the boundary layer to a value of the order of 10–50 times its normal thickness while creating a fully developed laminar boundary layer of constant thickness along the hull portion 2. It is necessary that this increase in thickness should not disturb the streamline 36 at the outer margin of this layer and for this reason the portion 2 of the hull is of smaller diameter than would otherwise be the case, the normal hull profile being indicated by the broken line 11, which is co-terminus with the surface of the parts 1 and 3. The increase in thickness of the boundary layer is thus partly accommodated in the space between the line 11 and the surface of the part 2.

Fig. 2 illustrates an application of the invention to aircraft. In this case the general arrangement is similar to Fig. 1 but at the downstream end, instead of a simple blade row 9 as in Fig. 1, the re-energising means comprises a two-stage ducted fan having a rotor 23 and two rows of blading 24, 25, with corresponding sator blading 26. This fan not only restores the original energy abstracted by blades 5 but supplies additional energy further to accelerate the boundary layer and act as a thrust augmentor.

The shaft 14 here assists in driving the rotor 23 through gear 30, the additional power required to drive the rotor being supplied from a motor 31 geared to shaft 14 through gears 32, 33.

Fig. 3 illustrates very diagrammatically and not to scale the effect of the blades 5 on the boundary layer. At the point X on the hill, the velocity gradient normal to the surface XY is represented by the curve XZ, the thickness of the boundary layer being YZ. A the point X' on the surface X' Y' the velocity gradient is represented by X'Z' and the thickness of the boundary layer is then Y'Z'.

As mentioned above, the streamline 36 remains undisturbed by virtue of the inward displacement of the surface X'Y' relative to the surface XY.

Fig. 4 shows the general design requirements for the turbine rotor and stator blades in the form of curves for the angles $\alpha$, $\beta$ and $\gamma$, these angles as shown in Figs. 5 and 6 being respectively the entry angle to the rotor blades 5, the exit angle from these blades and the entry angle to the stator blades 6.

I claim:

1. Means for reducing drag between a body and a fluid moving relatively to and in contact with said body comprising energy exchange means for absorbing energy from the boundary layer at an upstream region of said body, and further energy exchange means for imparting energy to the boundary layer at a downstream region of said body whereby the boundary layer being laminar in character is substantially thickened between said regions.

2. Means according to claim 1 wherein the body profile is recessed over the portion thereof between the said energy-absorbing and energy-imparting means to a depth substantially equal to the extent of the said thickening of the boundary layer.

3. Means according to claim 1 wherein the energy-absorbing means are arranged and proportioned to induce a velocity in said layer which increases with distance normally outwards from the surface in parabolic manner.

4. A hull structure having means for reducing drag between the surface of said structure and a fluid moving relatively to and in contact with said structure, comprising means located at an upstream region of said structure adapted to de-energise the boundary layer, and means located in a downstream region of said structure adapted to re-energise the boundary layer whereby the latter, being laminar in character, is substantially thickened between said regions.

5. A hull structure in the form of a solid of revolution comprising, at an upstream region of said structure, a rotating blade system mounted on a rotor and adapted to de-energise the boundary layer in a fluid moving relatively to and in contact with the surface of said structure, and at a downstream region a rotating blade system mounted on a rotor and adapted to re-energise the boundary layer whereby the latter, being laminar in character, is substantially thickened between said regions, the de-energising rotor being adapted to drive the re-energising rotor.

6. A hull structure according to claim 5 wherein the profile is reduced over the portion thereof between the de-energising and re-energising means to allow inward thickening of the boundary layer.

7. A hull structure according to claim 6 wherein the re-energising means comprise a ducted fan.

8. Means according to claim 1 including a bladed rotor constituting one of said energy exchange means rotatable about an axis extending lengthwise through said body which body in the region of said rotor is substantially a solid of revolution about the said axis.

9. Means according to claim 1 consisting in combination of a bladed rotor constructed and located to be rotated by the motion of said boundary layer and constituting said energy-absorbing means, the rotor being rotatable about an axis extending along the length of said body, a bladed fan rotor rotatable about the same said axis and located where it can drive said boundary layer and so constitute said energy-imparting means and a driving connection from the energy-absorbing rotor to the fan rotor, the said body in the region of each of said energy exchange means being substantially a solid of revolution about the said axis.

10. Means for reducing drag between a body and a fluid moving relatively to and in contact with said body comprising energy-absorbing means located in and constructed to be driven by the movement of the boundary layer at an upstream region of said body, fluid-driving means located in said boundary layer at a downstream region of said body, the boundary layer, which is laminar in character, being accordingly substantially thickened between said regions, and a driving connection from said energy-absorbing means to said fluid-driving means.

11. Means according to claim 10 wherein the body profile is recessed over the portion thereof between the energy-absorbing and energy-imparting means to a depth substantially equal to the extent of the said thickening of the boundary layer.

12. Means according to claim 11 wherein the energy-absorbing means are proportioned and arranged to induce a velocity in said layer which increases with distance normally outwards from the surface in parabolic manner.

FRANK WHITTLE.

REFERENCES CITED

The following references are of record in the file of this patent:

UNITED STATES PATENTS

| Number | Name | Date |
|---|---|---|
| 565,021 | Newburg | Aug. 4, 1896 |
| 1,833,722 | Prokop | Nov. 24, 1931 |
| 1,980,233 | Stout | Nov. 13, 1934 |
| 2,404,954 | Godsey | July 30, 1946 |